(12) United States Patent
Anh et al.

(10) Patent No.: US 8,814,188 B2
(45) Date of Patent: Aug. 26, 2014

(54) STRUT MOUNTING REINFORCEMENT UNIT OF VEHICLE

(71) Applicants: Hyundai Motor Company, Seoul (KR); Kia Motors Corporation, Seoul (KR)

(72) Inventors: Hyun Anh, Seoul (KR); Jaewoo Joung, Yonin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/710,087

(22) Filed: Dec. 10, 2012

(65) Prior Publication Data

US 2014/0049019 A1    Feb. 20, 2014

(30) Foreign Application Priority Data

Aug. 20, 2012  (KR) ................. 10-2012-0090919

(51) Int. Cl.
  *B60G 15/00*  (2006.01)
  *B60G 15/06*  (2006.01)
  *B62D 21/00*  (2006.01)

(52) U.S. Cl.
  CPC ........ *B60G 15/067* (2013.01); *B60G 2204/128* (2013.01); *B60G 15/068* (2013.01); *B62D 21/00* (2013.01)
  USPC .................................. 280/124.155; 267/220

(58) Field of Classification Search
  CPC ............... B60G 15/067; B60G 15/068; B60G 2204/128
  USPC .................... 280/124.145, 124.146, 124.147, 280/124.154, 124.155; 267/220
  See application file for complete search history.

(56) References Cited

U.S. PATENT DOCUMENTS

| | | | | |
|---|---|---|---|---|
| 4,175,771 A | * | 11/1979 | Muzechuk et al. | 280/124.155 |
| 4,465,296 A | * | 8/1984 | Shiratori et al. | 280/124.155 |
| 5,150,886 A | * | 9/1992 | Hamberg et al. | 267/220 |
| 5,308,048 A | * | 5/1994 | Weaver et al. | 267/220 |
| 5,375,870 A | * | 12/1994 | Smith et al. | 180/299 |
| 5,775,720 A | * | 7/1998 | Kmiec et al. | 188/322.15 |
| 6,007,061 A | * | 12/1999 | Kammel et al. | 267/220 |
| 6,161,822 A | * | 12/2000 | Hurst et al. | 267/220 |
| 6,260,836 B1 | * | 7/2001 | Aoyama et al. | 267/221 |
| 7,926,869 B2 | * | 4/2011 | Kim | 296/187.11 |
| 8,528,966 B2 | * | 9/2013 | Kim | 296/198 |
| 2005/0093286 A1 | * | 5/2005 | Oh | 280/788 |
| 2012/0138757 A1 | * | 6/2012 | Hong et al. | 248/205.1 |

FOREIGN PATENT DOCUMENTS

| | | | |
|---|---|---|---|
| JP | 6-255532 A | | 9/1994 |
| JP | 2009-78575 A | | 4/2009 |
| KR | 10-2004-0042176 A | | 5/2004 |
| KR | 2004089818 A | * | 10/2004 |
| KR | 10-2004-0100023 A | | 12/2004 |
| KR | 2005037151 A | * | 4/2005 |
| KR | 10-2007-0059348 A | | 6/2007 |
| KR | 10-2007-0061659 A | | 6/2007 |

* cited by examiner

*Primary Examiner* — Paul N Dickson
*Assistant Examiner* — Laura Freedman
(74) *Attorney, Agent, or Firm* — Morgan, Lewis & Bockius LLP (57) ABSTRACT

The strut mounting reinforcement unit of a vehicle includes a shock absorber housing cover in which a strut may be inserted, the shock absorber housing cover being mounted to a vehicle body together with the strut, a shock absorber cover panel covering an upper portion of the shock absorber housing cover to be mounted to the vehicle body, and a closed space formed between the shock absorber housing cover and the shock absorber cover panel, thereby improving strength of a strut mounted portion of the vehicle body.

3 Claims, 6 Drawing Sheets

STRUT MOUNTING REINFORCEMENT UNIT OF VEHICLE

CROSS-REFERENCE TO RELATED APPLICATION

The present application claims priority to Korean Patent Application No. 10-2012-0090919 filed in the Korean Intellectual Property Office on Aug. 20, 2012, the entire contents of which is incorporated herein for all purposes by this reference.

BACKGROUND OF THE INVENTION

1. Field of the Invention

The present invention relates to a strut mounting reinforcement unit of a vehicle for improving vehicle body mounting point strength when a strut of the vehicle is mounted on the vehicle body.

2. Description of Related Art

A strut type of suspension apparatus in the related art includes a strut in which a shock absorber is embedded and is installed between wheels and a vehicle body.

That is, an upper portion of the strut is mounted on a wheel housing provided in a fender apron constituting a front vehicle body, and a lower portion of the strut is mounted in a suspension arm connected to the wheels to be supported.

The strut is mounted on various portions of the vehicle body while being generally fastened to the various portions through a bolt and a nut, strength of a fastened portion where the strut is fastened to the vehicle body, that is, strength of a mounting point, acts as an important factor for ride comfort, driving stability, and noise and vibration performance of the vehicle, so that it is necessary to improve strength of the mounting point.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a strut mounting reinforcement unit of a vehicle having advantages of improving ride comfort, driving stability, and noise and vibration performance of the vehicle by improving strength of a vehicle body mounting point in a direction of a height of the vehicle body of a strut installed between wheels and the vehicle body.

In an aspect of the present invention, a strut mounting reinforcement unit of a vehicle may include a shock absorber housing cover in which a strut is inserted, the shock absorber housing cover being mounted to a vehicle body together with the strut, a shock absorber cover panel covering an upper portion of the shock absorber housing cover to be mounted to the vehicle body, and a closed space formed between the shock absorber housing cover and the shock absorber cover panel.

A partial section of the shock absorber housing cover is spaced apart from a partial section of the shock absorber cover panel to form the closed space.

The strut is a front strut mounted between the vehicle body and front wheels.

A partial section of remaining portions except for a strut mounted portion in the shock absorber housing cover may include a closed space formed section in which the closed space is formed, wherein a partial section of remaining portions except for a welded portion at which the shock absorber cover panel is welded to a cowl in the shock absorber cover panel may include a closed space formed section in which the closed space is formed.

The shock absorber housing cover is generally formed in a quadrangular panel shape, wherein a center boss having a first fastening hole in which an upper end of the strut is inserted is formed at a center portion of the quadrangular panel shape of the shock absorber housing cover, wherein the strut mounted portion is formed to be continued with a lower end outer edge of the center boss, and the closed space formed section is formed while being stepped downward with respect to the strut mounted portion, wherein the shock absorber cover panel is formed in a quadrangular panel shape, wherein a second fastening hole in which the upper end of the strut is inserted is formed at a center portion of the quadrangular panel shape of the shock absorber cover panel, and wherein the closed space formed section is formed adjacent to a partial section of a flat upper surface of the shock absorber cover panel in which the second fastening hole is formed.

A drain hole communicated with the closed space is formed at the closed space formed section of the shock absorber cover panel, wherein a drain hole configured to make the closed space be communicated with the outside of the vehicle body is formed at the closed space formed section of the shock absorber housing cover.

According to the exemplary embodiment of the present invention, the panel for mounting the strut to the vehicle body has a double panel structure including the shock absorber housing cover and the shock absorber cover panel mounted on the shock absorber housing cover. A closed space is formed between the remaining portions except for the strut mounted portion in the shock absorber housing cover and the remaining regions except for a cowl mounted region in the shock absorber cover panel.

The panel for mounting the strut to the vehicle body has the double panel structure having the closed space, thereby improving strength in a height direction of the vehicle body.

As described above, the strut is mounted to the vehicle body through the panel with improved strength, so that strength of the mounting of the strut to the vehicle body is increased, thereby improving ride comfort, operation stability, and noise and vibration performance of the vehicle and improving merchantability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 1:
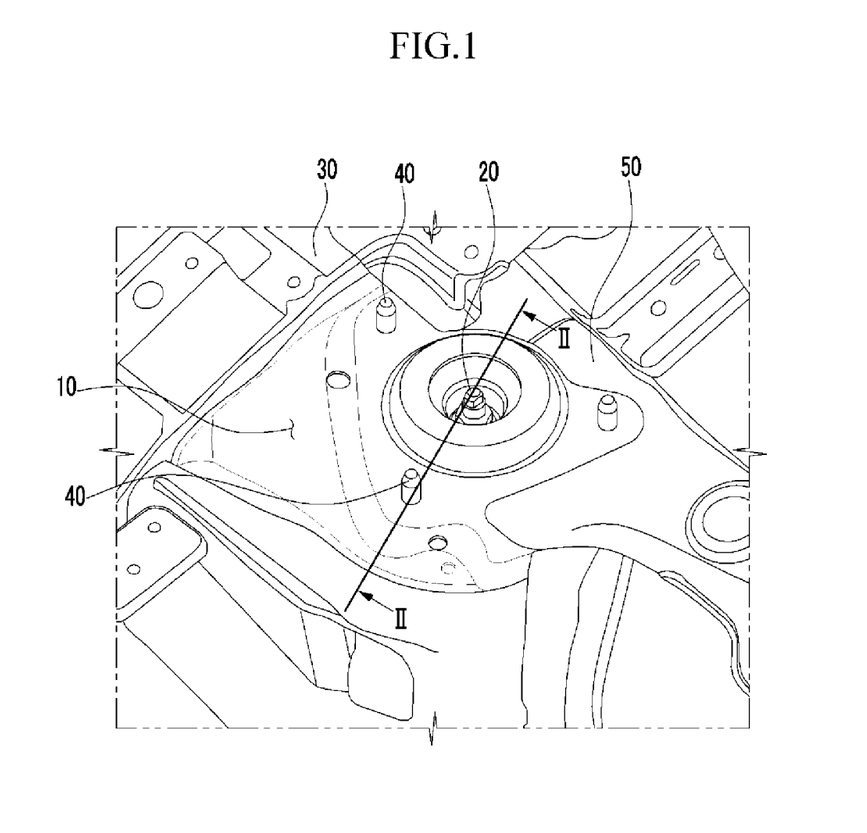
FIG. 1 is a perspective view of a state in which a strut is mounted to a vehicle body through a strut mounting reinforcement unit of a vehicle according to an exemplary embodiment of the present invention.

Referring to FIG. 1, a strut 20 is inserted in a vehicle body 30 from a lower portion of the vehicle body 30 to be mounted to the vehicle body 30 by a strut mounting reinforcement unit 10 of a vehicle according to an exemplary embodiment of the present invention.

A plurality of fastening bolts 40 is fastened with nuts while passing through each of the strut 20 and the vehicle body 30, so that the strut 20 is mounted to the vehicle body 30.

Figure 2:
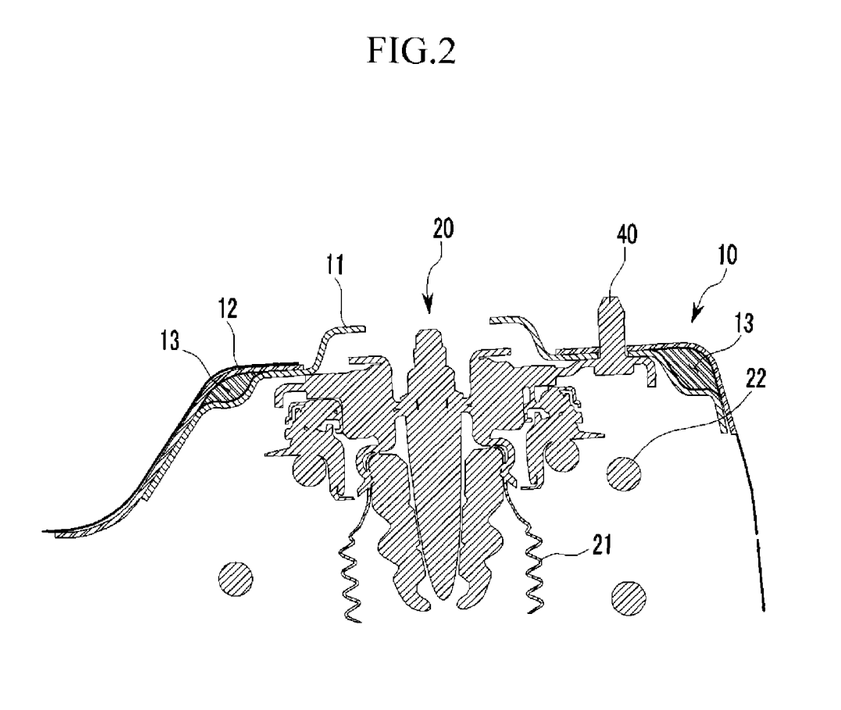
FIG. 2 is a cross-sectional view taken along line II-II of FIG. 1.

Referring to FIG. 2, the strut 20 includes a shock absorber 21 for absorbing and buffering vibration and shock and a spring 22 fitted to an outer circumference of the shock absorber 21 to absorb and buffer vibration and shock.

The strut mounting reinforcement unit 10 includes a shock absorber housing cover 11 in which an upper portion of the shock absorber 21 is inserted, and a shock absorber cover panel 12 covering an upper portion of the shock absorber housing cover 11.

When the strut 20 is a front strut, the shock absorber housing cover 11 may have a thickness of 2.3 t, and the shock absorber cover panel 12 may have a thickness of 2.0 t.

A partial section of the shock absorber housing cover 11 is spaced apart from a partial section of the shock absorber cover panel 12 corresponding to the partial section of the shock absorber housing cover 11 to form a space having a predetermined size, and the space is completely blocked by the shock absorber housing cover 11 and the shock absorber cover panel 12 to form a closed space 13 having a closed cross section.

Figure 3:
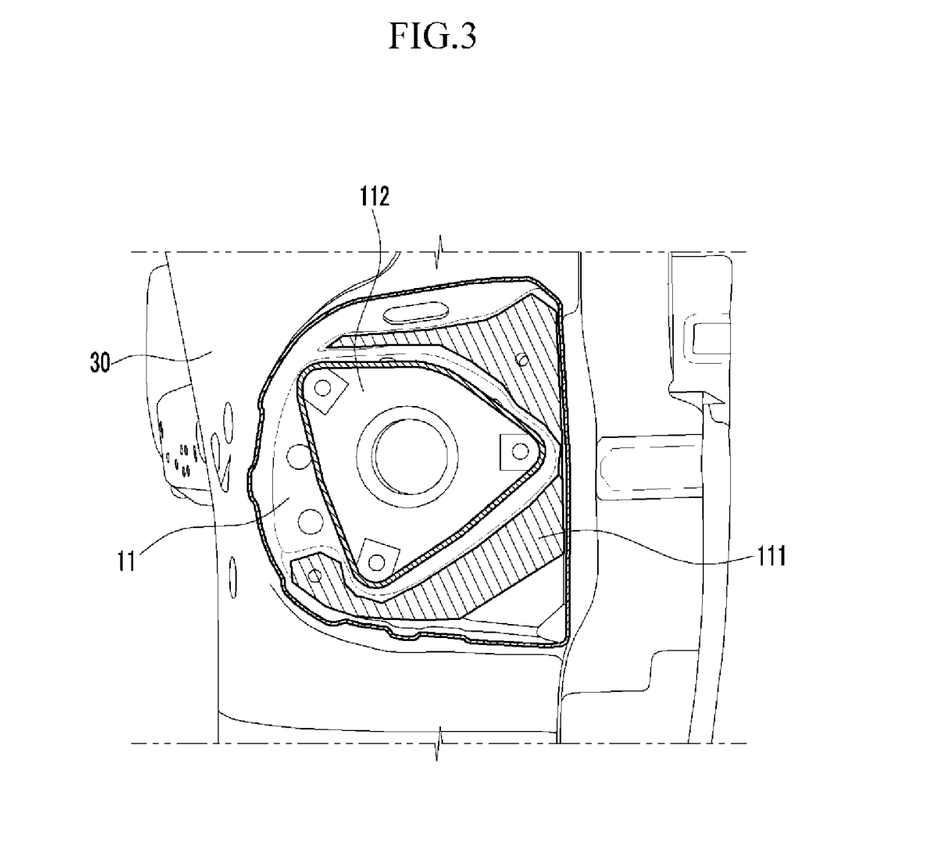
FIG. 3 is a perspective view of a state in which a shock absorber housing cover is mounted to a vehicle body according to an exemplary embodiment of the present invention.

Referring to FIG. 3, a closed space formed section 111 formed at the shock absorber housing cover 11 is indicated.

A part of the remaining portion, except for a strut mounting portion 112, in the shock absorber housing cover 11 forms the closed space formed section 111.

Figure 4:
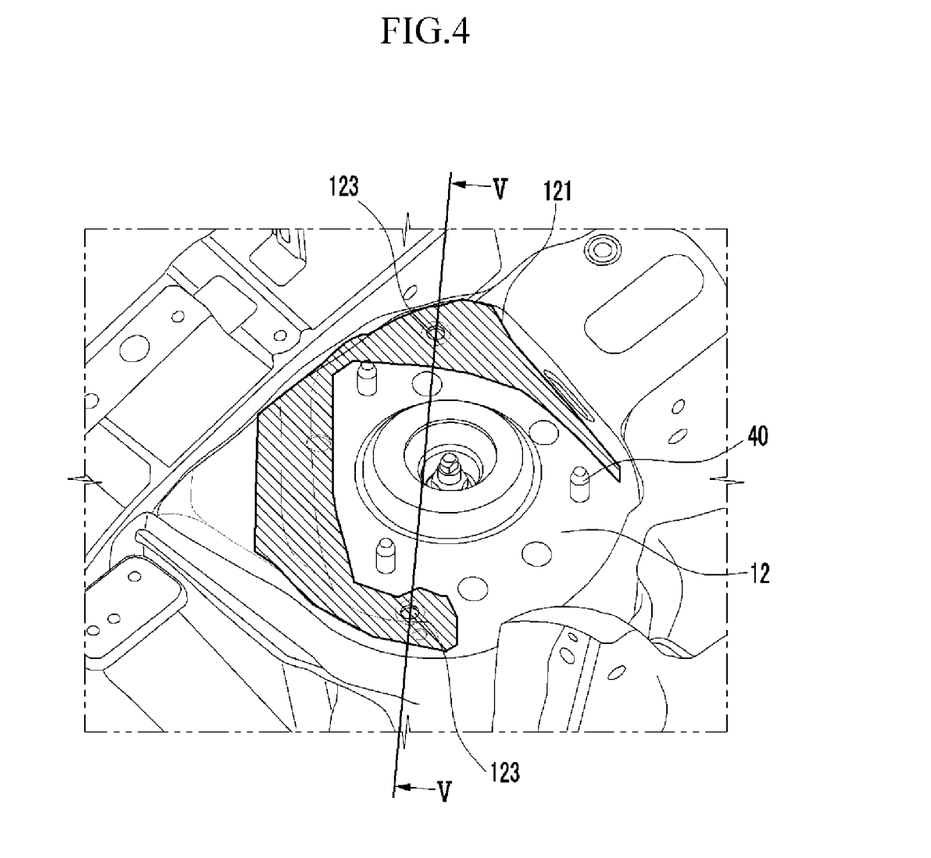
FIG. 4 is a perspective view of a state in which a shock absorber housing cover panel is mounted to a vehicle body according to an exemplary embodiment of the present invention.

Referring to FIG. 4, a closed space formed section 121 formed at the shock absorber housing cover panel 12 is indicated.

When the strut 10 is the front strut, the shock absorber housing cover panel 12 is welded to a cowl 50 (illustrated in FIG. 1) constituting the vehicle body, and a part of the remaining portions, except for a welded section in which the shock absorber housing cover panel 12 is welded to the cowl 50, forms the closed space formed section 121.

The closed space formed section 121 also has the same shape as that of the closed space formed section 111 of the shock absorber housing cover 11.

Figure 5:
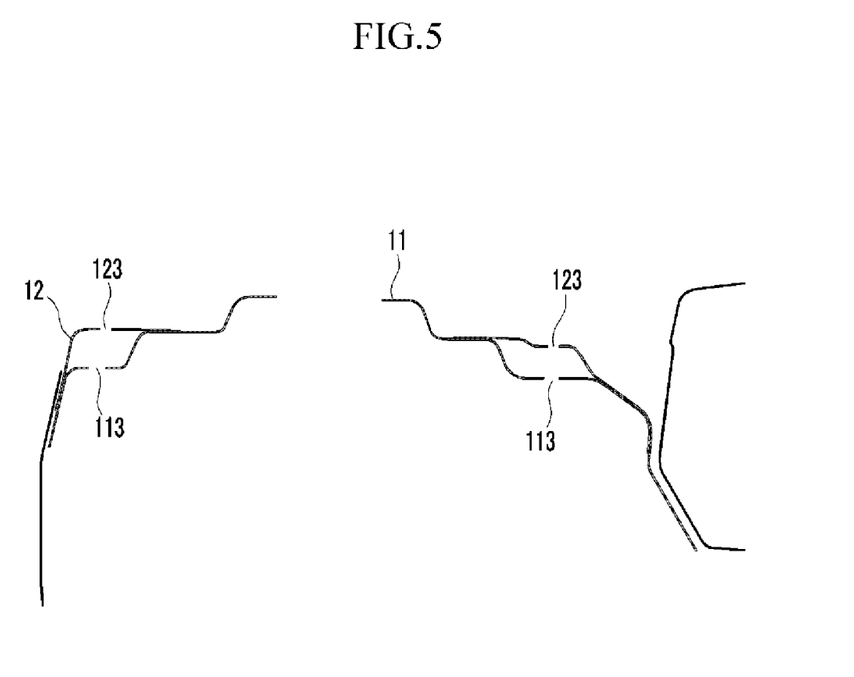
FIG. 5 is a cross-sectional view taken along line V-V of FIG. 4.

Referring to FIGS. 4 and 5, the shock absorber housing cover 11 has a drain hole 113 passing through the shock absorber housing cover 11, and the shock absorber cover panel 12 also has a drain hole 123 passing through the shock absorber cover panel 12.

The drain hole 123 is formed at a partial portion of the closed space formed section 121, that is, a portion at which water may be collected due to the formation of the closed space 13, and the drain hole 13 is formed at a portion corresponding to the drain hole 123 so as to discharge water flowing in the closed space 13 through the drain hole 123 to the outside of the vehicle body.

Figure 6:
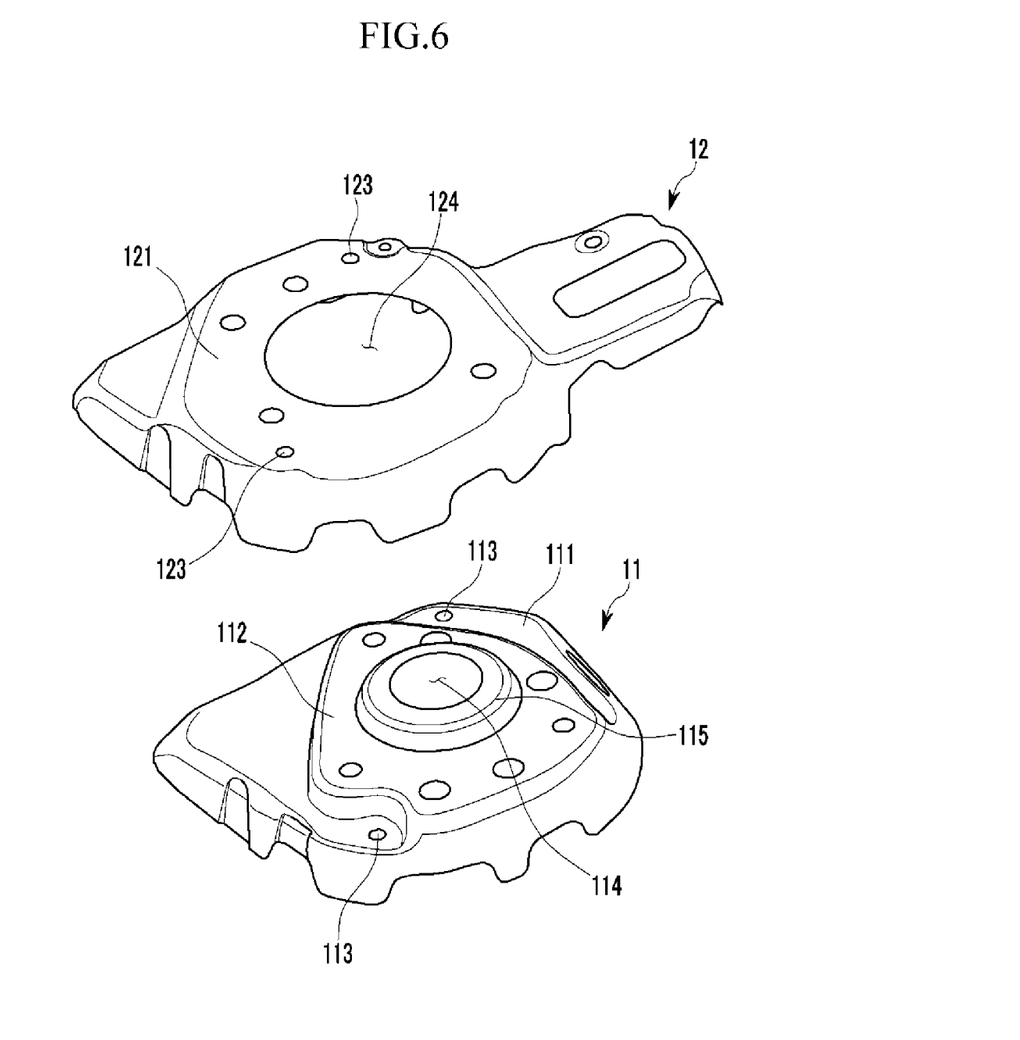
FIG. 6 is an exploded perspective view of a strut mounting reinforcement unit of a vehicle according to an exemplary embodiment of the present invention.

Referring to FIG. 6, the shock absorber housing cover 11 generally has a quadrangular panel shape, and a center boss 115 having a fastening hole 114 in which an upper end of the shock absorber 21 is inserted is formed at a center portion of the quadrangular panel shape.

The strut mounting portion 112 is formed so as to be continued with a lower end outer edge of the center boss 115, and the closed space formed section 111 is formed while being stepped downward with respect to the strut mounting portion 112.

The shock absorber cover panel 12 also generally has a quadrangular panel shape, a fastening hole 124 in which an upper end of the shock absorber 21 is inserted is formed at a center portion of the quadrangular panel shape, and the closed space formed section 121 is formed at a partial section of a flat upper surface in which the fastening hole 124 is formed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A strut mounting reinforcement unit of a vehicle, comprising:
 a shock absorber housing cover in which a strut is inserted, the shock absorber housing cover being mounted to a vehicle body together with the strut;
 a shock absorber cover panel covering an upper portion of the shock absorber housing cover to be mounted to the vehicle body; and
 a closed space formed between the shock absorber housing cover and the shock absorber cover panel;
 wherein a partial section of the shock absorber housing cover is spaced apart from a partial section of the shock absorber cover panel to form the closed space;
 wherein the strut is a front strut mounted between the vehicle body and front wheels;
 wherein a partial section of remaining portions except for a strut mounted portion in the shock absorber housing cover includes a first closed space formed section in which the closed space is formed; and
 wherein a partial section of remaining portions except for a welded portion at which the shock absorber cover panel is welded to a cowl in the shock absorber cover panel includes a second closed space formed section in which the closed space is formed.

2. The strut mounting reinforcement unit of claim 1,
 wherein the shock absorber housing cover is generally formed in a quadrangular panel shape,
 wherein a center boss having a first fastening hole in which an upper end of the strut is inserted is formed at a center portion of the quadrangular panel shape of the shock absorber housing cover,
 wherein the strut mounted portion is formed to be continued with a lower end outer edge of the center boss, and the first closed space formed section is formed while being stepped downward with respect to the strut mounted portion,
 wherein the shock absorber cover panel is formed in a quadrangular panel shape,
 wherein a second fastening hole in which the upper end of the strut is inserted is formed at a center portion of the quadrangular panel shape of the shock absorber cover panel, and
 wherein the second closed space formed section is formed adjacent to a partial section of a flat upper surface of the shock absorber cover panel in which the second fastening hole is formed.

3. A strut mounting reinforcement unit of a vehicle, comprising:
 a shock absorber housing cover in which a strut is inserted, the shock absorber housing cover being mounted to a vehicle body together with the strut;
 a shock absorber cover panel covering an upper portion of the shock absorber housing cover to be mounted to the vehicle body; and
 a closed space formed between the shock absorber housing cover and the shock absorber cover panel;
 wherein a drain hole communicated with the closed space is formed at the closed space formed section of the shock absorber cover panel; and
 wherein a drain hole configured to make the closed space be communicated with the outside of the vehicle body is formed at the closed space formed section of the shock absorber housing cover.

\* \* \* \* \*

UNITED STATES PATENT AND TRADEMARK OFFICE
CERTIFICATE OF CORRECTION

| | |
|---|---|
| PATENT NO. | : 8,814,188 B2 |
| APPLICATION NO. | : 13/710087 |
| DATED | : August 26, 2014 |
| INVENTOR(S) | : Hyun Ahn et al. |

Page 1 of 1

It is certified that error appears in the above-identified patent and that said Letters Patent is hereby corrected as shown below:

On the title page, item (72) in the Inventors:

After "Hyun," delete "ANH" and insert --AHN--.

Signed and Sealed this
Eleventh Day of November, 2014

Michelle K. Lee
*Deputy Director of the United States Patent and Trademark Office*